UNITED STATES PATENT OFFICE.

FRANCIS J. KRAFT, OF SAN FRANCISCO, CALIFORNIA.

IMPROVEMENT IN TREATING FATS TO SEPARATE THE STEARINE FROM THE OLEINE.

Specification forming part of Letters Patent No. 153,350, dated July 21, 1874; application filed February 20, 1874.

*To all whom it may concern:*

Be it known that I, FRANCIS JOSEPH KRAFT, of the city and county of San Francisco and State of California, have invented an Improved Process for Separating the Stearine from Oleine of Fat, of which the following is a specification:

The parts hereinafter mentioned are by weight.

The fat to be treated should be in the rendered condition and clear.

First step.—One hundred parts of fat are melted and heated to about 135° Fahrenheit, and turned into a tub (preferably one lined with lead) having the means for thoroughly stirring the contents by hand or machinery.

Second step.—Prepare a solution of two parts of sugar of lead to five of water.

Third step.—Prepare a solution of two parts of alum to five of water.

Fourth step.—Prepare a solution of two parts of bicarbonate of potash to five of water.

Fifth step.—Prepare a solution of two parts of nitrate of soda to five of water.

Sixth step.—Mix together the two solutions first named, to wit, those of sugar of lead and alum, and allow the mixture to settle; after which draw off the clear liquid, leaving the sediment as waste.

Seventh step.—Mix the last-named liquid with the two others, to wit, those of bicarbonate of potash and nitrate of soda.

Eighth step.—Turn this mixture of all the solutions into the fat, at the temperature named, and stir for one or two hours, until a separation of the stearine and oleine takes place.

Ninth step.—The mass is then put into a tub lined with lead, and having arrangements for boiling with open steam in any of the approved modes. Enough of water is then poured in to cover the steam-inlets and form a wash. From three to five parts of commercial sulphuric acid diluted with about ten parts of water are also added. The steam is then admitted, until the mass boils, for about half an hour.

Tenth step.—The steam is then shut off and the contents of the tub allowed to settle. The acid-water will be at the bottom. The stearine and oleine are then drawn off and cooled. This may be hastened in any of the usual modes, by distributing it into smaller vessels, or putting it into a single shallow one, or by applying ice or cooling mixtures, or otherwise.

Eleventh step.—The stearine and oleine are then pressed in the cold hydraulic press in the usual manner, until the oleine is expelled.

Twelfth step.—The stearine is then again boiled with open steam, with a little more of the dilute acid, when it is ready to be drawn off into candle-molds or for other use.

The result of this process is a larger percentage of stearine, of better quality, and at less cost, than by any method heretofore known. It resembles wax more nearly, both in color and quality, than any before produced.

It will be observed that my invention consists mainly in the new materials used in separating the stearine and oleine.

Having thus described my invention, what I claim as new, and desire to secure by Letters Patent, is—

The treatment of rendered fat for the separation of the stearine from the oleine, by subjecting it successively to the action of solutions of sugar of lead, alum, bicarbonate of potash, and nitrate of soda, and to mechanical pressure, substantially in the manner described.

FRANCIS JOSEPH KRAFT.

Witnesses:
 ALFRED RIX,
 DAVID STODDART.